United States Patent Office 3,187,485
Patented June 8, 1965

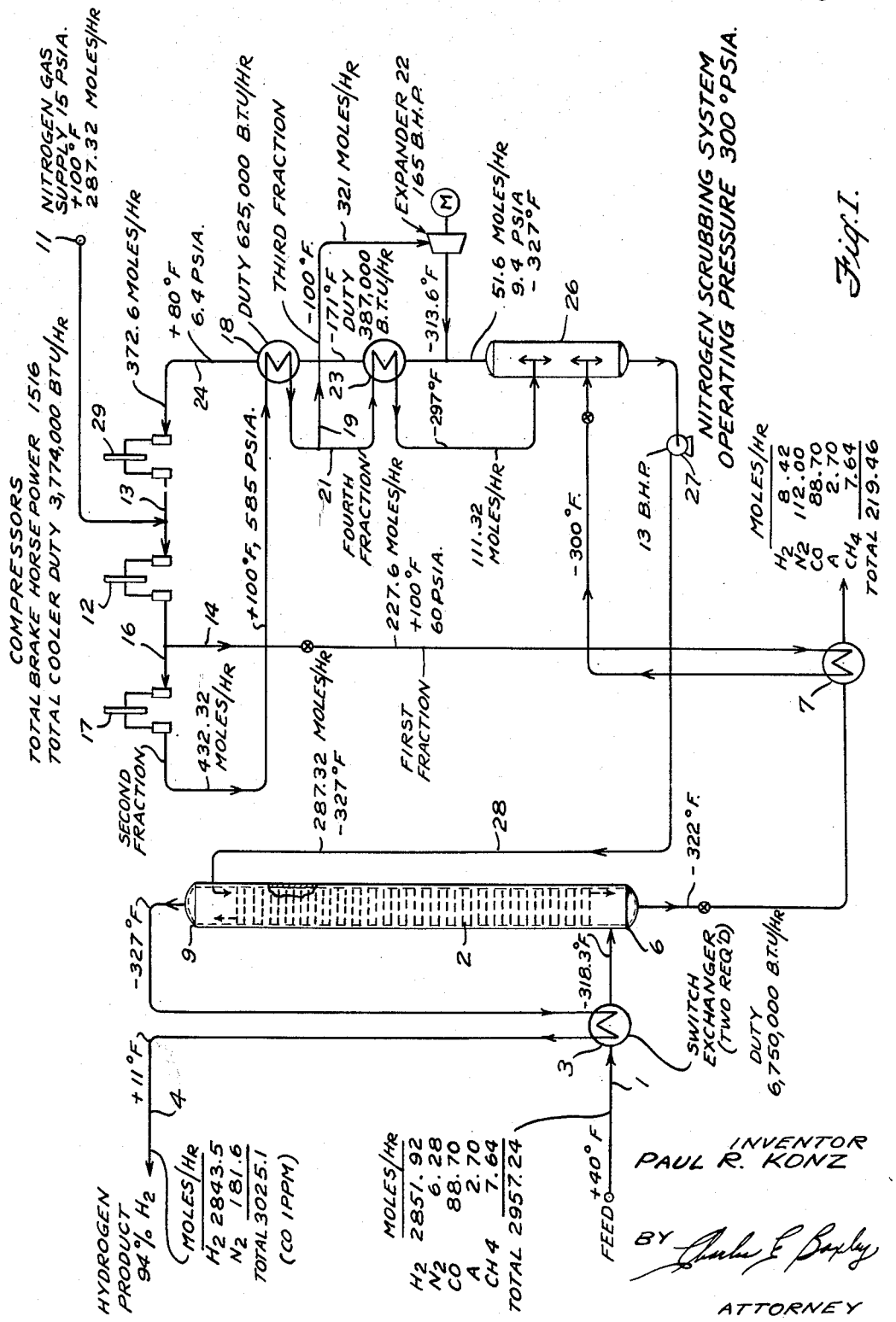

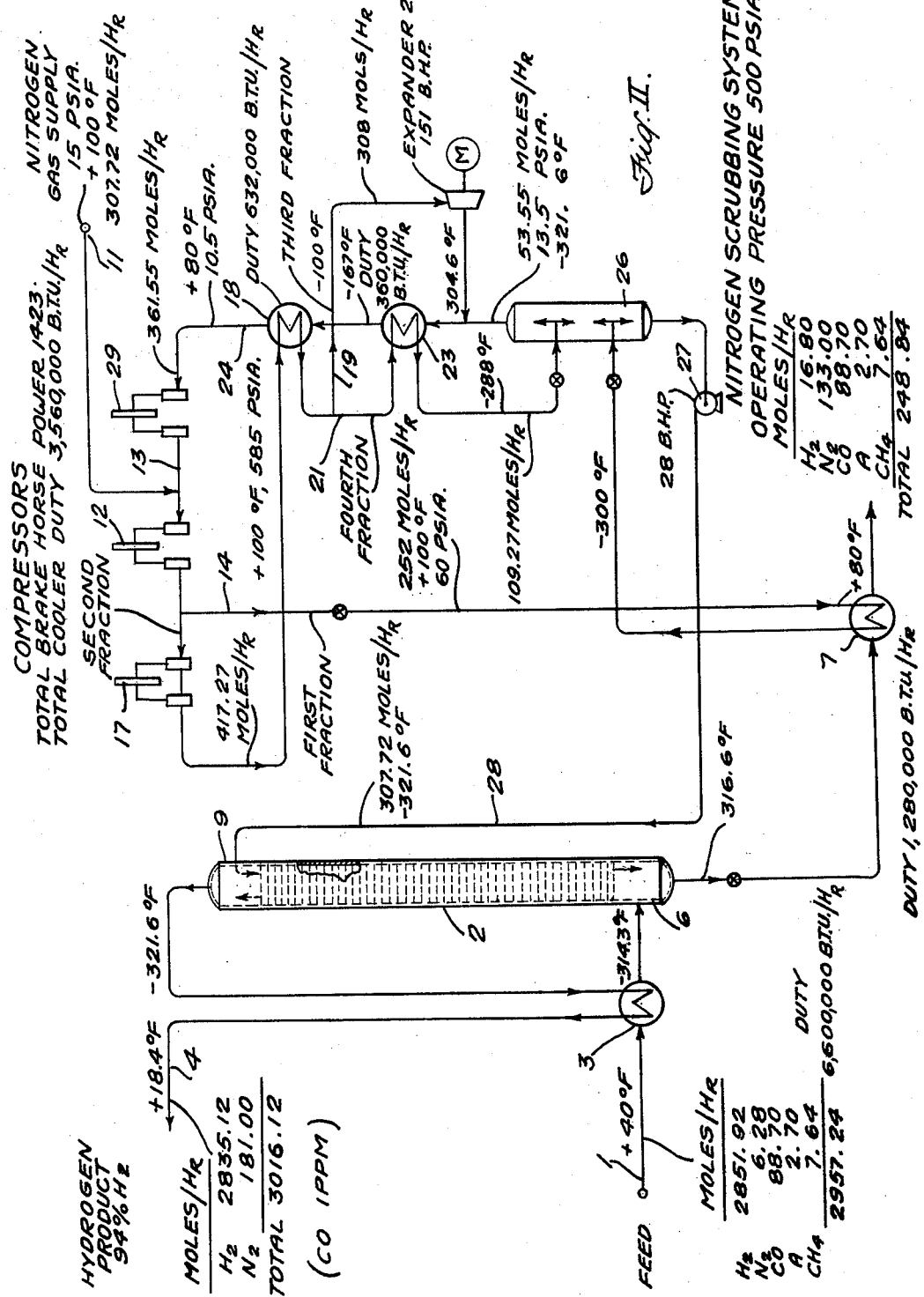

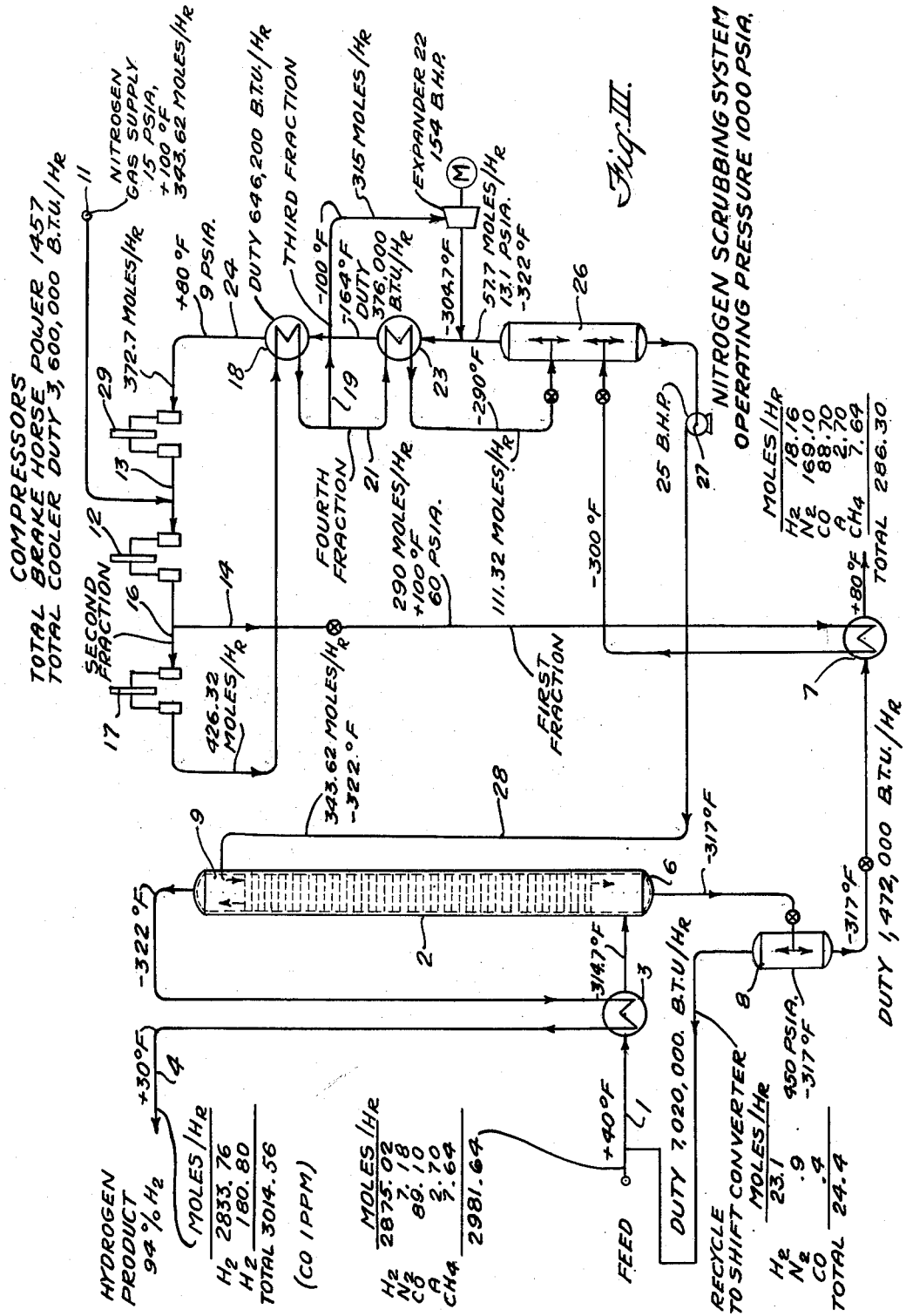

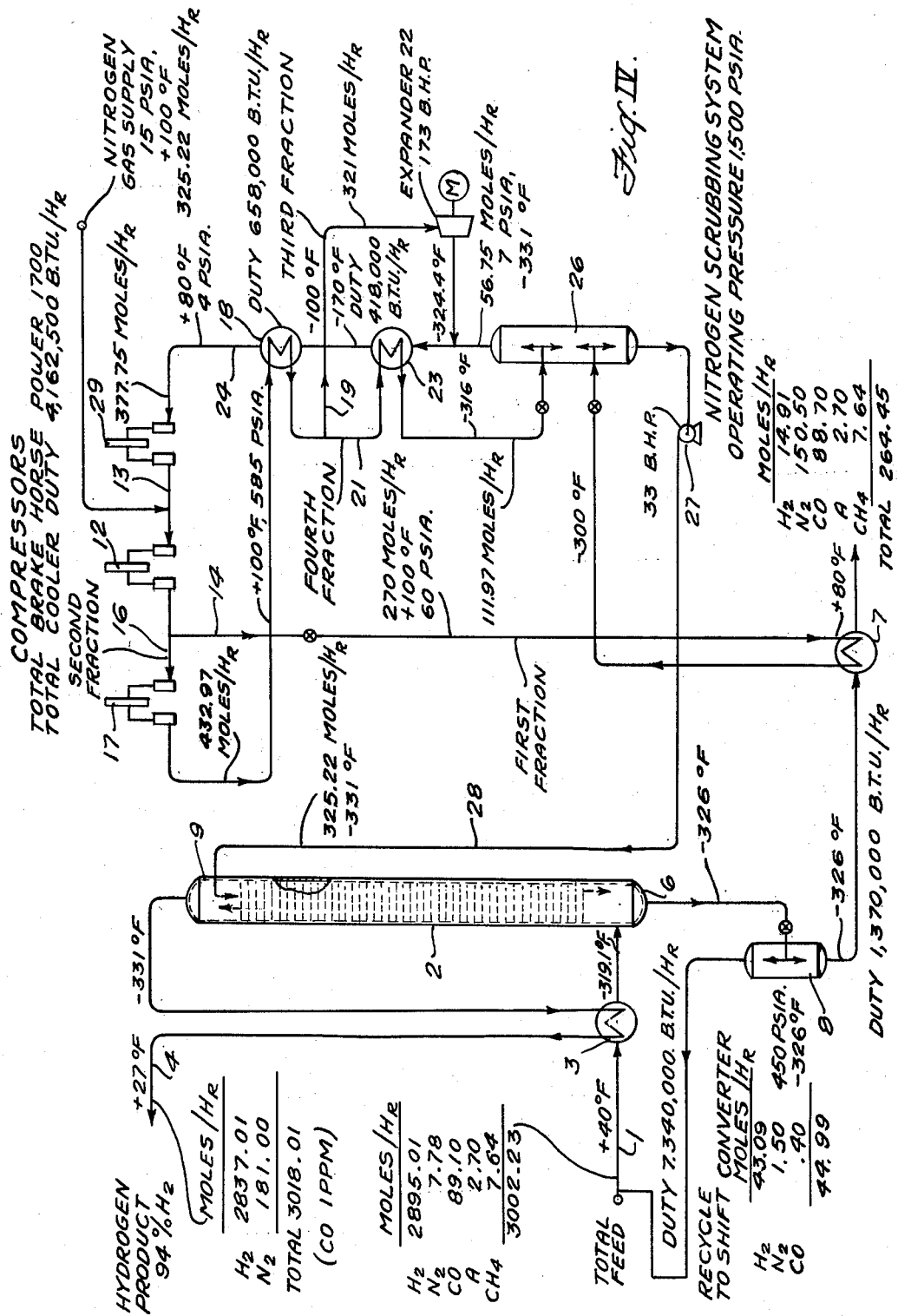

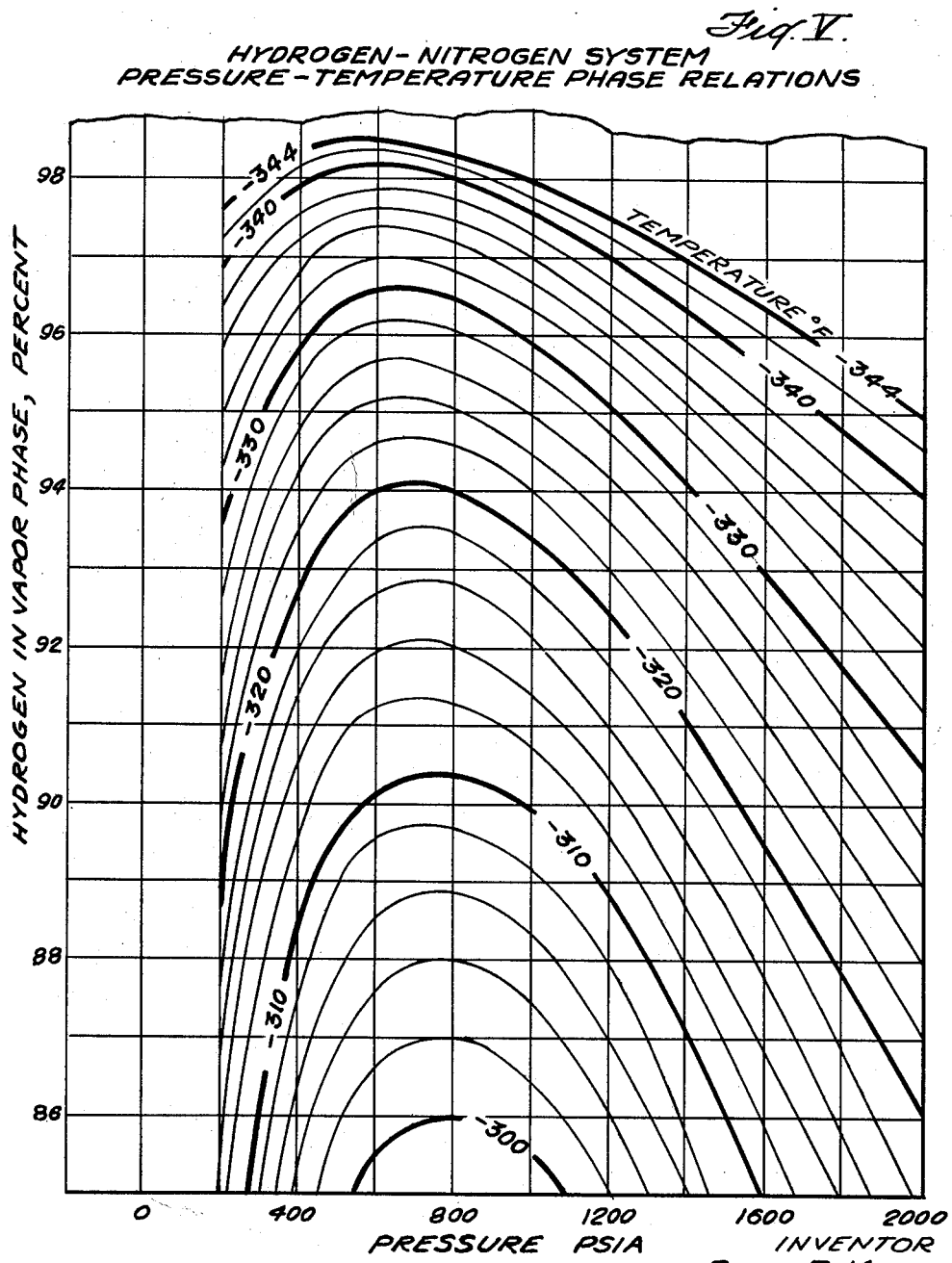

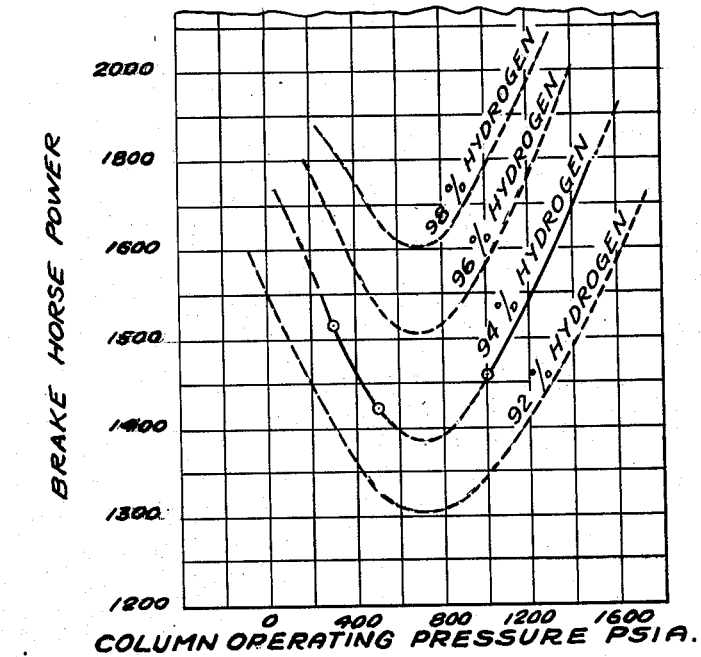
Fig. VI.
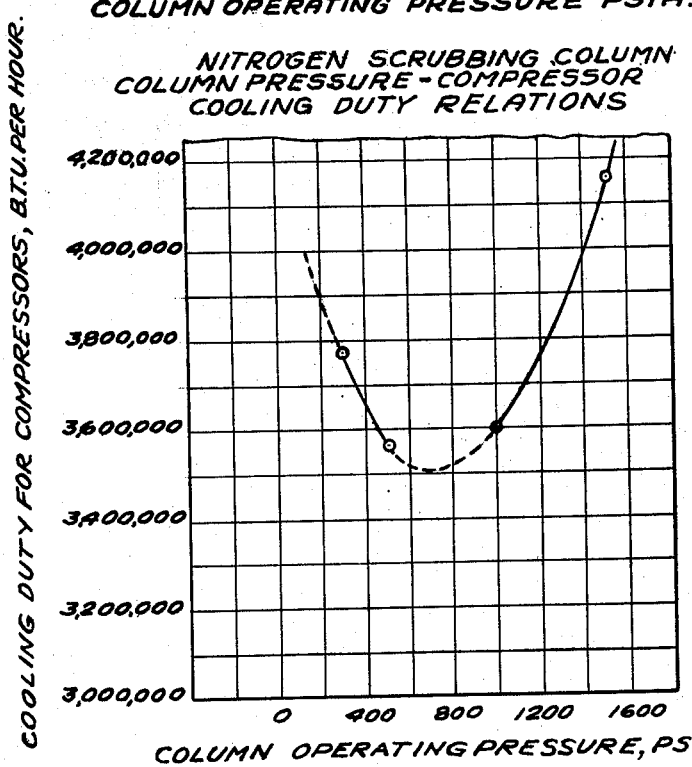
Fig. VII.
INVENTOR
PAUL R. KONZ
BY
ATTORNEY ered

3,187,485
PURIFICATION OF HYDROGEN BY SCRUBBING WITH NITROGEN AT HIGH PRESSURES
Paul R. Konz, New York, N.Y., assignor to Foster Wheeler Corporation, New York, N.Y., a corporation of New York
Filed Dec. 13, 1961, Ser. No. 159,055
7 Claims. (Cl. 55—48)

This invention relates to the purification of hydrogen. It is a process and system for scrubbing hydrogen with liquid nitrogen at high pressures.

Impurities commonly present in commercial raw hydrogen streams are carbon monoxide and methane as well as argon and various other inerts. Nitrogen scrubbing has been known to be effective in removing these impurities. But the pressure range employed has generally been from 150 to around 425 p.s.i.a. The present invention contemplates the use of higher pressures.

In nitrogen scrubbing some wash nitrogen is inevitably picked up by upflowing hydrogen. The primary advantage of the present teaching is that hydrogen product streams of minimal nitrogen diluent are conveniently attained. Further, if higher hydrogen purities are required, the stream would be amenable to refined nitrogen removal techniques such as freezing-out or absorption. Starting from the higher purity achieved by the present invention, apparatus requirements for such refined removal techniques would be lessened.

Another facet of this invention is that a practical operating range of pressures has been discovered wherein highly effective nitrogen scrubbing can be accomplished with optimized efficiency of mechanical energy input and liquid nitrogen requirements.

The present nitrogen washing process is very suitable to high pressure hydrogen generation since equipment designs are simplified and operational savings also accrue. Additionally, higher pressures permit economies in purification steps which precede nitrogen scrubbing. Carbon dioxide is generally removed from the gas by means of some chemical absorbent. If the gas is at high pressure, the partial pressure of the carbon dioxide is increased and the required size of chemical absorption equipment is reduced. At the high pressures here considered, methods of carbon dioxide removal other than chemical absorption can be employed. For example, physical absorption in a suitable solvent or condensation by temperature reduction could be used.

Water vapor must also be removed from hydrogen before the liquid nitrogen scrubbing operation. Here, much the same as in the case of carbon dioxide, high pressure favors partial condensation of water and reduces the required size of absorption equipment devoted to dehydration.

These and other advantages will appear more fully from the accompanying drawings wherein proportions, flows, temperatures and pressures are set forth.

FIGURE I illustrates a nitrogen scrubbing system using a cascade refrigeration cycle and with a column operating pressure of 300 p.s.i.a.

FIGURE II depicts a nitrogen scrubbing system similar to that of FIGURE I but having a column operating pressure of 500 p.s.i.a.

FIGURE III is for a column operating pressure of 1000 p.s.i.a.

FIGURE IV is for a column operating pressure of 1500 p.s.i.a.

FIGURE V shows pressure-temperature-phase relations for a hydrogen-nitrogen system.

FIGURE VI reveals the pressure-energy relations for various hydrogen purity yields.

FIGURE VII teaches the dependence compressor cooling duty on the column operating pressure.

It has been determined that the volatility of carbon monoxide and nitrogen are approximately equal at 1600 p.s.i.a. Therefore, this pressure represents the upper limit for operating such a scrubber column.

In the systems shown in FIGURES I through IV, feed gas stream 1 to nitrogen scrubbing column 2 must be free of carbon dioxide and water vapor. Usually this feed is available at +40° F. after leaving a suitable drying unit. The feed is conducted to precooler 3 where it is cooled to a temperature around —300° F. by non-contact counterflow heat exchange with departing purified hydrogen product stream 4. It is generally possible for the feed to be cooled to a temperature within approximately 10 degrees of that at which the hydrogen product stream enters precooler 3. Precooler 3 freezes out trace amounts of carbon dioxide and water vapor still present in the feed gas. These impurities build up in the precooler passages. To prevent fouling of precooler 3, it is connected in parallel flow arrangement with a duplicate apparatus. Flow of feed gas is diverted periodically to alternate between the precoolers in these parallel paths. Deposits in the standby precooler can be expelled by flushing with nitrogen gas. This apparatus arrangement is known commonly in industry as a switch exchanger.

From precooler 3 feed gas is conducted to bottom 6 of nitrogen scrubbing column 2. In column 2 the hydrogen is subjected to direct contact with downflowing liquid nitrogen. Carbon monoxide, methane, argon and other impurities in the hydrogen are absorbed by the liquid nitrogen.

Column bottom liquid nitrogen effluent provides refrigeration by flashing in bottom evaporator 7.

In the scrubbing operation nitrogen picks up some hydrogen. The amount of hydrogen dissolvable in nitrogen increases with pressure. Accordingly, to minimize loss at pressures above 500 p.s.i.a., the bottom effluent is flashed in vessel 8 at 450 p.s.i.a., as shown in the flow diagrams of FIGURES III and IV for 1000 and 1500 p.s.i.a. pressures, respectively. Flash vapor in vessel 8 is predominantly hydrogen with some carbon monoxide and nitrogen. These vapors are recycled to the main feed stream. Recycle would very suitably re-enter the feed stream above the water gas shift reaction. From a design viewpoint, there is little temperature change in vessel 8 induced by flashing because desorption of hydrogen liberates heat while desorption of carbon monoxide and nitrogen absorb heat. The opposing effects substantially balance each other.

Liquid nitrogen enters scrubbing column 2 at top 9. Cryogenic requirements are shown in FIGURES I through IV for the various pressures there treated. It is highly important that liquid nitrogen be supplied at no higher than the designed top temperature of column 2, so that nitrogen flashing with consequent dilution of the hydrogen product will be avoided.

Liquification of nitrogen is here accomplished by a mechanical cryogenic system. Nitrogen is shown to be provided from a typical gaseous source 11 at one atmosphere and 100° F. The nitrogen gas is compressed at 12 together with recycle stream 13 to 60 p.s.i.a. The gas is then divided into first fraction 14 and second fraction 16. First fraction 14 is liquified in bottom evaporator 7 and is conducted to vessel 26 from whence it is delivered to the scrubbing column.

Second fraction 16 is compressed at 17 to about 600 p.s.i.a. and is passed through heat exchanger 18 where it is cooled to —100° F. by recycle nitrogen. Second fraction 16 is then divided into third fraction 19 and fourth fraction 21.

Third fraction 19 passes through expander 22 doing work and lowering its temperature. The third fraction then passes in non-contacting counterflow heat exchange relationship through heat exchangers 23 and 18 and becomes recycle nitrogen gas which joins nitrogen feed 11.

Fourth fraction 21 is liquified in heat exchanger 23 which is cooled by recycle third fraction 24. The fourth fraction is flashed in vessel 26 at a pressure suitable to produce the temperature desired for input into nitrogen scrubbing column 2. Pump 27 in line 28 transmits liquid nitrogen from vessel 26 to the nitrogen column.

The first fraction joins the fourth fraction in vessel 26 for delivery to the nitrogen column.

Nitrogen flash vapor from vessel 26 joins third fraction gas recycle from expander 22 in passing through the cold sides of heat exchangers 23 and 18 and is then compressed to one atmosphere at 29 to be admitted to the nitrogen supply 11.

A refrigeration pressure of approximately 600 p.s.i.a. is chosen in large measure because of structural considerations inherent in the apparatus. Further, a study of pressures from 100 to 2000 p.s.i.a. indicated that this pressure is also highly desirable from a compression energy input viewpoint.

As seen from the pressure-temperature phase relations of FIGURE V, the purity of the hydrogen product stream depends upon both temperature and pressure. For a particular yield, optimizing the pressure can permit the attainment of a desired hydrogen purity at a higher temperature. Temperature has a pronounced influence on nitrogen refrigeration power requirements. In this regard, data are assembled in Tables A on material balances for a nitrogen scrubbing column at 300, 500, 1000 and 1500 p.s.i.a. In Table B are collected corresponding horsepower and compressor duty requirements. The percent of nitrogen in the hydrogen product stream for these examples is shown as 6 percent. Of course, as pointed up in FIGURES V and VI, higher purities are attainable.

In the graphic examples here set forth, a hydrogen feed representative for the catalytic reformation of a light hydrocarbon is used. The feed composition is as follows:

| Component: | Percent by volume |
|---|---|
| $H_2$ | 96.44 |
| $N_2$ | 0.21 |
| CO | 3.00 |
| $CH_4$ | 0.26 |
| A | 0.09 |
| Total | 100.00 |

The pressure-temperature phase relations of FIGURE V sets forth isotherms of hydrogen content versus nitrogen column operating pressure. If a hydrogen content of 94 percent is to be provided, the temperature of the top tray at 200 p.s.i.a. must be maintained at −331° F., for 400 p.s.i.a. the temperature can be −323° F. and will continue to increase with increased pressure until a pressure of about 700 p.s.i.a. is reached. Beyond 700 p.s.i.a. the required top tray temperature decreases so that at 1400 p.s.i.a. the required top tray temperature is −329° F.

As is seen in FIGURE VI, the power required for column operation also minimizes at a nitrogen column pressure of 700 p.s.i.a. Mechanical energy requirements for higher hydrogen purities form a nest of curves within the 94 percent curve and also minimize at about 700 p.s.i.a. In the production of a hydrogen product of less purity, say 90 percent, the curve lies below the 94 percent curve and is symmetrical therewith.

The duty of the compressors related to nitrogen column operating pressure is plotted in FIGURE VIII. This curve also shows a minimum bend point at 700 p.s.i.a.

A comparison of the power requirement curve of FIGURE VI with the phase diagram of FIGURE V fortifies the finding that the power curves for hydrogen contents above 94 percent also show minimums in the neighborhood of 700 p.s.i.a.

It will be understood by those skilled in hydrogen production that wide changes may be made in the details of this teaching without departing from the spirit of invention defined in the claims.

TABLE A

*Material balances for nitrogen scrubbing column*

[Hydrogen product 94%]

| Net feed: | Moles/hr. |
|---|---|
| $H_2$ | 2,851.92 |
| $N_2$ | 6.28 |
| CO | 88.70 |
| A | 2.70 |
| $CH_4$ | 7.64 |
| | 2,957.24 |

| Recycle: | 1,000 p.s.i.a., moles/hr. | 1,500 p.s.i.a., moles/hr. |
|---|---|---|
| $H_2$ | 23.1 | 43.09 |
| $N_2$ | .9 | 1.50 |
| CO | .4 | .40 |
| A | | |
| $CH_4$ | | |
| | 24.4 | 44.90 |

| Column pressure | Total feed, moles/hr. | Liquid nitrogen to column, moles/hr. | Bottom product, moles/hr. | Hydrogen product, moles/hr. |
|---|---|---|---|---|
| 300 p.s.i.a.: | | | | |
| $H_2$ | 2,851.92 | | 8.42 | 2,843.50 |
| $N_2$ | 6.28 | 287.32 | 112.00 | 181.60 |
| CO | 88.70 | | 88.70 | |
| A | 2.70 | | 2.70 | |
| $CH_4$ | 7.64 | | 7.64 | |
| | 2,957.24 | 287.52 | 219.46 | 3,025.10 |
| 500 p.s.i.a.: | | | | |
| $H_2$ | 2,851.92 | | 16.80 | 2,835.12 |
| $N_2$ | 6.28 | 307.72 | 133.00 | 181.00 |
| CO | 88.70 | | 88.70 | |
| A | 2.70 | | 2.70 | |
| $CH_4$ | 7.64 | | 7.64 | |
| | 2,957.24 | 307.72 | 234.84 | 3,016.12 |
| 1,000 p.s.i.a.: | | | | |
| $H_2$ | 2,875.02 | | 18.16 | 2,833.76 |
| $N_2$ | 7.18 | 343.62 | 169.10 | 180.80 |
| CO | 89.10 | | 88.70 | |
| A | 2.70 | | 2.70 | |
| $CH_4$ | 7.64 | | 7.64 | |
| | 2,981.64 | 343.62 | 286.30 | 3,014.56 |
| 1,500 p.s.i.a.: | | | | |
| $H_2$ | 2,895.01 | | 14.91 | 2,837.01 |
| $N_2$ | 7.78 | 325.22 | 150.50 | 181.00 |
| CO | 89.10 | | 88.70 | |
| A | 2.70 | | 2.70 | |
| $CH_4$ | 7.65 | | 7.64 | |
| | 3,002.23 | 325.22 | 264.45 | 3,018.01 |

TABLE B

*Nitrogen scrubbing column data*

[For one part per million of carbon monoxide in top tray, vapor, 25 theoretical trays in column. Hydrogen product 94%]

| | Operating pressure, p.s.i.a. | | | |
|---|---|---|---|---|
| | 300 | 500 | 1,000 | 1,500 |
| Liq. nitrogen to column, moles/hr | 287.32 | 307.72 | 344.52 | 325.22 |
| Compressor brake horsepower, total | 1,516 | 1,423 | 1,457 | 1,700 |
| Compressors after coolers duty, B.t.u./hr., total | 3,774,000 | 3,560,000 | 3,600,000 | 4,162,500 |
| Temp. of liq. nitrogen to column, °F | −327 | −321.6 | −322 | −331 |
| $K_{CO_2}$, top | 0.0495 | 0.053 | 0.064 | 0.0655 |
| $K_{CO_2}$, bottom | 0.0515 | 0.063 | 0.068 | 0.0655 |
| L/VK, top | 1.91 | 1.74 | 1.786 | 1.65 |
| L/VK, bottom | 1.44 | 1.42 | 1.532 | 1.57 |
| Hydrogen loss to btms., percent | 0.3 | 0.6 | 0.6 | 0.5 |

What is claimed is:

1. A process for purifying a gaseous stream consisting essentially of hydrogen and small amounts of a substance selected from the group consisting of carbon monoxide, methane, argon and mixtures thereof comprising the steps of continuously providing a source of substantially pure nitrogen gas, compressing and liquifying said nitrogen gas, continuously feeding the pure liquid nitrogen into contact with said gaseous stream at a pressure from 500 p.s.i.a. to 1600 p.s.i.a. at a temperature in the range of −310° F. to −344° F. absorbing said substance from the stream, continuously disposing of the liquid nitrogen and absorbed substance to waste following said contact.

2. A process for purifying a gaseous stream consisting essentially of hydrogen and small amounts of a substance selected from the group consisting of carbon monoxide, methane, argon and mixtures thereof comprising the steps of continuously providing a source of substantially pure ntirogen gas, compressing and liquifying said nitrogen gas, continuously feeding the pure liquid nitrogen into contact with said gaseous stream at a pressure from 600 p.s.i.a. to 800 p.s.i.a. at a temperature in the range of −300° F. to −344° F. absorbing said substance from the stream, continuously disposing of the liquid nitrogen and absorbed substance to waste following said contact.

3. A process for purifying a gaseous stream consisting essentially of hydrogen and small amounts of a substance selected from the group consisting of carbon monoxide, methane, argon and mixtures thereof comprising the steps of continuously providing a source of substantially pure nitrogen gas, compressing and liquifying said nitrogen gas, continuously feeding the pure liquid nitrogen into contact with said gaseous stream at a pressure from 650 p.s.i.a. to 750 p.s.i.a. at a temperature in the range of −300° F. to −344° F. absorbing said substance from the stream, continuously disposing of the liquid nitrogen and absorbed substance to waste following said contact.

4. A process for purifying a gaseous stream consisting essentially of hydrogen and small amounts of a substance selected from the group consisting of carbon monoxide, methane, argon and mixtures thereof comprising the steps of cooling the gaseous stream, passing the gaseous stream upward through an absorption column at a pressure of from 500 to 1600 p.s.i.a., continuously providing a source of substantially pure nitrogen gas, compressing and liquifying said nitrogen gas, continuously introducing the pure liquefied nitrogen into the top of the column at a pressure from 500 p.s.i.a. to 1600 p.s.i.a. at a temperature in the range of −310° F. to −344° F., temperature being sufficiently low so that the liquid nitrogen will not flash in the column, passing the liquid nitrogen downward through the column in direct contact with the upflowing gaseous stream absorbing said substance from the stream, continuously disposing of the liquid nitrogen and absorbed substance to waste following said contact.

5. A process for purifying a gaseous stream consisting essentially of hydrogen and small amounts of a substance selected from the group consisting of carbon monoxide, methane, argon and mixtures thereof comprising the steps of cooling the gaseous stream below −300° F., passing the gaseous stream upward through an absorption column at a pressure of from 500 to 1600 p.s.i.a., continuously providing a source of substantially pure nitrogen gas, compressing and liquifying said nitrogen gas, continuously introducing the pure liquefied nitrogen into the top of the column at a pressure from 500 p.s.i.a. to 1600 p.s.i.a. at a temperature in the range of −310° F. to −344° F., the temperature being sufficiently low so that the liquid nitrogen will not flash in the column, passing the liquid nitrogen downward through the column in direct contact with the upflowing gaseous stream absorbing said substance from the stream, continuously disposing of the liquid nitrogen and absorbed substance to waste following said contact.

6. A process for purifying a gaseous stream consisting essentially of hydrogen and small amounts of a substance selected from the group consisting of carbon monoxide, methane, argon, and mixtures thereof comprising the steps of cooling the gaseous stream below −300° F., passing the gaseous stream upward through an absorption column at a pressure of from 500 to 1600 p.s.i.a., continuously providing a source of substantially pure nitrogen gas, compressing and liquifying said nitrogen gas, continuously introducing the pure liquefied nitrogen into the top of the column at a pressure from 500 p.s.i.a. to 1600 p.s.i.a. at a temperature in the range of −310° F. to −344° F., the temperature being sufficiently low so that the liquid nitrogen will not flash in the column, passing the liquid nitrogen downward through the column in direct contact with the upflowing gaseous stream absorbing said substance from the stream, continuously withdrawing as column bottoms the liquid nitrogen and absorbed substance following said contact, flashing the column bottoms to separate any hydrogen absorbed in the liquid nitrogen from the nitrogen, the flashing being carried out under conditions whereby little temperature change is induced by the flashing, recycling the separated hydrogen to the absorption column so that it passes upward through the column and continuously disposing of the desorbed liquid nitrogen and absorbed substance of waste following said flashing.

7. A process for purifying a gaseous stream consisting essentially of hydrogen and small amounts of a substance selected from the group consisting of carbon monoxide, methane, argon and mixtures thereof, comprising the steps of pre-cooling the gaseous stream below −300° F., passing the gaseous stream upward through an absorption column at a pressure of from 500 to 1600 p.s.i.a., continuously providing a source of substantially pure nitrogen gas, compressing and liquifying said nitrogen gas, continuously introducing the pure liquified nitrogen into the top of the column at a pressure from 500 p.s.i.a. to 1600 p.s.i.a. at a temperature in the range of −310° F. to −344° F., the temperature being sufficiently low so that the liquid nitrogen will not flash in the column, passing the liquid nitrogen downward through the column in direct contact with the upflowing gaseous stream absorbing said substance from the stream, continuously withdrawing as column bottoms the liquid nitrogen and absorbed substance following said contact, flashing the column bottoms to separate any hydrogen absorbed in the liquid nitrogen from the nitrogen, the flashing being carried out under conditions whereby little temperature change is induced by the flashing, recycling the separated hydrogen to the absorption column so that it passes upward through the column, continuously withdrawing a top product hydrogen stream from the column, passing the top product hydrogen stream in non-contact heat exchange relationship with the gaseous stream to accomplish said pre-cooling, and continuously disposing of the desorbed liquid nitrogen and absorbed substance to waste following said flashing.

References Cited by the Examiner

UNITED STATES PATENTS

| | | | |
|---|---|---|---|
| 2,820,769 | 1/58 | Haringhuizen | 62—23 |
| 2,865,864 | 12/58 | Eastman et al. | 252—377 |
| 2,959,020 | 11/60 | Knapp | 62—23 X |
| 2,975,605 | 3/61 | Haringhuizen | 52—24 |
| 2,983,585 | 5/61 | Smith | 23—213 X |
| 2,990,690 | 7/61 | Martin | 62—20 X |
| 3,004,628 | 10/61 | Hunt et al. | 55—43 |
| 3,011,589 | 12/61 | Meyer | 55—68 X |
| 3,095,274 | 6/63 | Crawford | 62—23 |
| 3,097,940 | 7/63 | Houston | 62—23 |

REUBEN FRIEDMAN, *Primary Examiner.*

HARRY B. THORNTON, *Examiner.*

UNITED STATES PATENT OFFICE
CERTIFICATE OF CORRECTION

Patent No. 3,187,485                                                     June 8, 1965

Paul R. Konz

It is hereby certified that error appears in the above numbered patent requiring correction and that the said Letters Patent should read as corrected below.

Column 4, TABLE A, third column, line 6 thereof, for "287.52" read -- 287.32 --; same table, fourth column, line 12 thereof, for "284.84" read -- 248.84 --; same column, same table second column, line 23 thereof, for "7.65" read -- 7.64 --; same column 4, TABLE B, first column, line 13 thereof, for "Hysrogen" read -- Hydrogen --; column 6, line 22, for "of" read -- to --.

Signed and sealed this 16th day of November 1965.

(SEAL)
Attest:

ERNEST W. SWIDER                                          EDWARD J. BRENNER
Attesting Officer                                              Commissioner of Patents